US012663078B1

(12) United States Patent
Viviano

(10) Patent No.: US 12,663,078 B1
(45) Date of Patent: Jun. 23, 2026

(54) PARK PAWL CONTROL SYSTEM AND METHOD FOR OPERATING SAME ON A VEHICLE

(71) Applicant: FCA US LLC, Auburn Hills, MI (US)

(72) Inventor: Robert A. Viviano, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/180,824

(22) Filed: Apr. 16, 2025

(51) Int. Cl.
 *F16H 63/48* (2006.01)
 *F16H 61/00* (2006.01)
 *F16H 61/28* (2006.01)
 *F16H 63/34* (2006.01)
(52) U.S. Cl.
 CPC ......... *F16H 63/48* (2013.01); *F16H 63/3425* (2013.01); *F16H 63/3466* (2013.01); *F16H 2061/0087* (2013.01); *F16H 2061/283* (2013.01)
(58) Field of Classification Search
 CPC ............. F16D 63/3425; F16D 63/3433; F16D 63/3466; F16D 63/48; F16D 63/483; F16D 2061/0087; F16D 2061/283; B60T 1/005; B60T 1/062; B60W 10/182; B60W 2710/188
 See application file for complete search history.

(56) References Cited

U.S. PATENT DOCUMENTS

| | | | | | |
|---|---|---|---|---|---|
| 5,696,679 | A | * | 12/1997 | Marshall | F16H 63/3416 701/1 |
| 11,346,444 | B2 | * | 5/2022 | Creech | F16H 63/3433 |
| 11,619,302 | B2 | * | 4/2023 | Davis | F16H 63/3425 192/219.5 |

FOREIGN PATENT DOCUMENTS

| | | |
|---|---|---|
| CN | 104260712 B | 1/2015 |
| CN | 108016429 B | 5/2018 |
| DE | 102024002793 A1 | 10/2024 |

* cited by examiner

*Primary Examiner* — Richard M Lorence
(74) *Attorney, Agent, or Firm* — Jeremy J. Klobucar

(57) ABSTRACT

A park securement system includes a park pawl system and a controller. The park pawl system has a park pawl, an actuator, a park gear and a sensor. The park pawl has a pawl engagement member, a park tooth, and a magnet. The actuator is configured to rotate a cam into engagement with the park engagement member that imparts rotational motion onto the park pawl. The sensor is configured to sense the magnet and communicate a signal indicative of a position of the park pawl. The controller is configured to: command the park pawl to a neutral resting state; record a park pawl value at the neutral resting state; determine a park pawl angle for additional regions based on the recorded park pawl value; and implement the determined park pawl angle for additional regions when one of engaging and disengaging the park pawl on subsequent cycle.

17 Claims, 8 Drawing Sheets

PARK PAWL CONTROL SYSTEM AND METHOD FOR OPERATING SAME ON A VEHICLE

FIELD

The present application generally relates to park pawl systems and techniques for operating vehicle park pawl systems.

BACKGROUND

A park pawl system comprises a park pawl that is selectively engaged/disengaged (e.g., to a toothed park gear wheel) to physically lockup a driveline of a vehicle. In vehicles, park securement systems are used to secure the vehicle from rolling when the driver requests for the vehicle to be in park and to allow the vehicle to drive when the vehicle is in a non-park setting (e.g., such as neutral, drive or reverse). A controller is used to control the actuation of an actuator to engage and disengage the pawl from the toothed wheel using software. In some configurations, a sensor, such as a hall effect sensor is used to detect the position (engaged, disengaged, etc.) of the pawl as a method to confirm the position of the pawl. In many conventional arrangements, the pawl does not have significant difference in position between engaged, tooth-to-tooth (pawl resting on a park gear tooth), and disengaged regions. In this regard, sensor error combined with part-to-part variation in system hardware can make it difficult to establish sensor ranges that correspond to each pawl region. Accordingly, while such conventional park securement systems do work well for their intended purpose, there exists an opportunity for improvement in the relevant art.

SUMMARY

According to one example aspect of the invention, a park securement system for vehicle is presented. The park securement system includes a park pawl system and a controller. The park pawl system has a park pawl, an actuator, a park gear and a sensor. The park pawl has a pawl engagement member, a park tooth, and a magnet. The actuator is configured to rotate a cam into engagement with the park engagement member that imparts rotational motion onto the park pawl. The park gear has a plurality of teeth and cavities, wherein the park pawl interacts with the plurality of teeth and cavities between engaged and disengaged positions. The sensor is configured to sense the magnet and communicate a signal indicative of a position of the park pawl. The controller is configured to: command the park pawl to a neutral resting state; record a park pawl value at the neutral resting state; determine a park pawl angle for additional regions based on the recorded park pawl value; and implement the determined park pawl angle for additional regions when one of engaging and disengaging the park pawl on subsequent cycle.

In some implementations, the neutral resting state is a maximum disengaged state between the park pawl and the park gear.

According to another example aspect of the invention, the park pawl value is indicative to duty cycle of the sensor.

In some implementations, the sensor is a hall effect sensor and park pawl angle is represented by a duty cycle percentage of the hall effect sensor.

In examples, each degree of park pawl angle is indicative of 10% duty cycle percentage.

In other examples, the system includes a biasing member that biases the cam into engagement with the park pawl.

In other implementations, the additional regions comprises a disengaged region indicative of the park pawl being disengaged from the park gear.

In other examples, the additional regions comprises a tooth-butt region indicative of the park tooth on the park pawl engaging a tooth of the plurality of teeth on the park gear.

In still other examples, the additional regions comprises an engaged position indicative of the park tooth nested into a cavity of the plurality of cavities between adjacent teeth of the plurality of teeth.

In additional examples, a method of operating a park securement system for a vehicle is provided. The park securement system having a park pawl system and a controller, the park pawl system having a park pawl, an actuator, a park gear and a sensor, the park pawl having a pawl engagement member, a park tooth, and a magnet, the actuator configured rotates a cam into engagement with the park engagement member that imparts rotational motion onto the park pawl, the park gear having a plurality of teeth and cavities, wherein the park pawl interacts with the plurality of teeth and cavities between engaged and disengaged positions, the sensor configured to sense the magnet and communicate a signal indicative of a position of the park pawl. The method includes commanding the park pawl to a neutral resting state; recording a park pawl value at the neutral resting state; determining a park pawl angle for additional regions based on the recorded park pawl value; and implementing the determined park pawl angle for additional regions when one of engaging and disengaging the park pawl on subsequent cycle.

In other features of the method, the neutral resting state is a maximum disengaged state between the park pawl and the park gear.

In additional examples of the method, the park pawl value is indicative to duty cycle of the sensor.

In other features of the method, the sensor is a hall effect sensor and park pawl angle is represented by a duty cycle percentage of the hall effect sensor.

In additional examples of the method, each degree of park pawl angle is indicative of 10% duty cycle percentage.

In other features of the method, the additional regions comprises a disengaged region indicative of the park pawl being disengaged from the park gear.

In additional examples of the method, the additional regions comprises a tooth-butt region indicative of the park tooth on the park pawl engaging a tooth of the plurality of teeth on the park gear.

In other examples, the additional regions comprises an engaged position indicative of the park tooth nested into a cavity of the plurality of cavities between adjacent teeth of the plurality of teeth.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
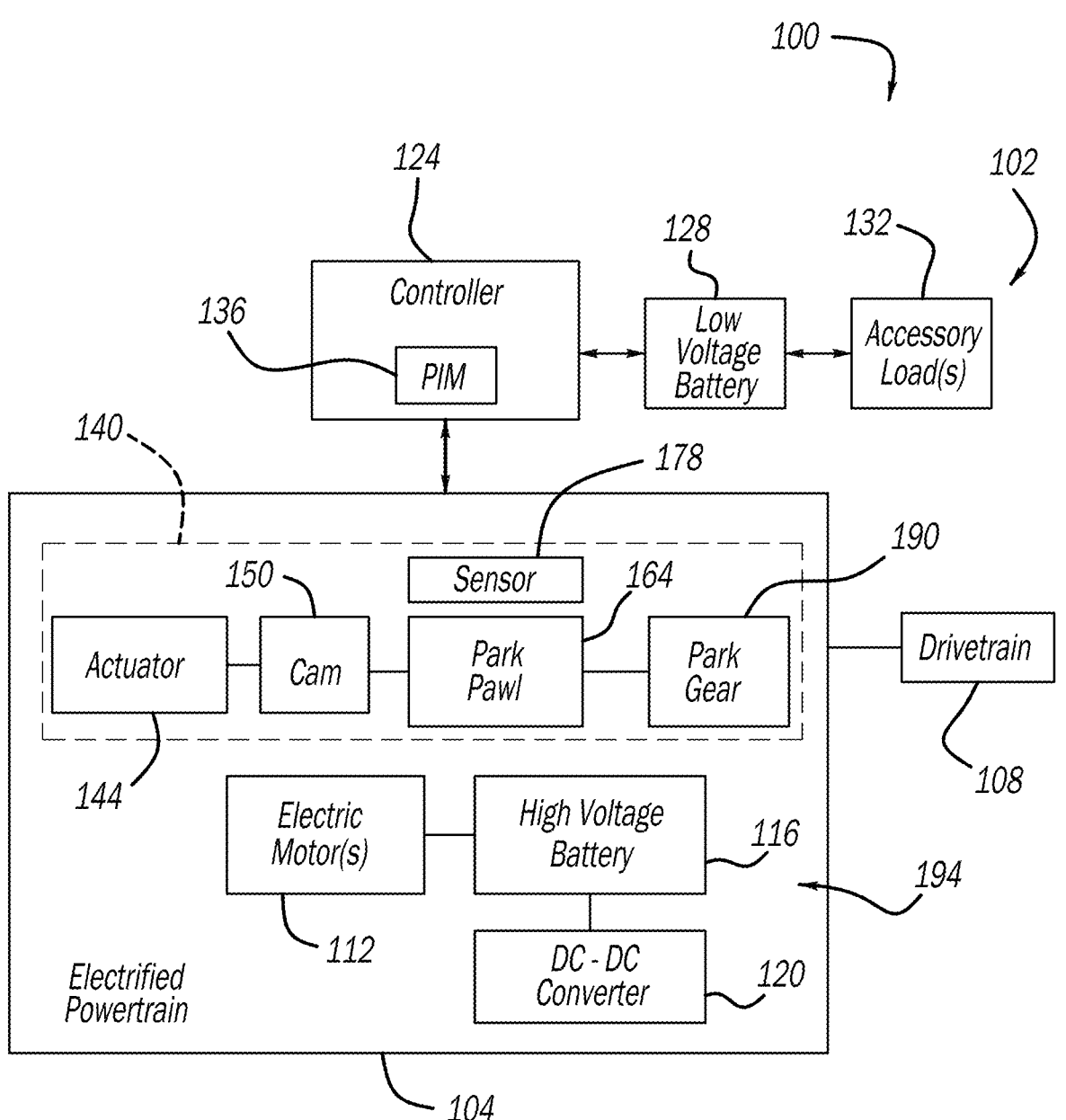
FIG. 1 is a functional block diagram of an exemplary vehicle comprising an example park securement system according to the principles of the present application.

As previously mentioned, park securement systems are used to secure the vehicle from rolling when the driver requests for the vehicle to be in park and to allow the vehicle to drive when the vehicle is in a non-park setting (e.g., such as neutral, drive or reverse). A controller is used to control the actuation of an actuator to engage and disengage the pawl from the toothed wheel (e.g., park gear) using software. In some configurations, a sensor, such as a hall effect sensor is used to detect the position (engaged, disengaged, etc.) of the pawl as a method to confirm the position of the pawl. In operation, there are a few major regions that the pawl can settle relative to the park gear: fully engaged, fully disengaged, and in-between. Due to the mounting position of a pawl sensor being on the case of the park system with the magnet on the pawl, it can be difficult to set values for the bounds of each region that will apply to every unit in the population of park systems due to part-to-part variation of the pawl, magnet, sensor, mounting positions, etc. This leads to the problem of effectively using the pawl sensor, especially when trying to discern more than just engaged and disengaged regions. Tooth-to-tooth is an important in-between region to measure as this is commonly the position the pawl will land when the actuator fully engages and compresses a spring to fully insert the pawl in between the teeth of the park gear once the park gear is rotated slightly. Tooth-to-tooth would be treated as an engaged position, however there will be separation in the bounds between tooth-to-tooth and fully engaged that should be discerned. In sum, the pawl does not have significant difference in position between engaged, tooth-to-tooth (pawl resting on a park gear tooth), and disengaged region. In this regard, sensor error combined with part-to-part variation in system hardware can make it difficult to establish sensor ranges that correspond to each pawl region.

Accordingly, the present disclosure provides techniques for obtaining adaptive pawl sensor regions through sensor learning. Calibrations are tuned based on pawl position sensor parameters and park system hardware stack-up analysis. The park pawl is commanded to a neutral resting state (maximum disengaged state). The pawl sensor value at this state is recorded as a reference. The regions for disengaged, tooth-butt, and engaged are calculated using calculations from identified parameters from the tuned calibrations. The newly defined regions are subsequently used when engaging and disengaging the park pawl. The process can be selected whether to be performed every key cycle, or can be stored in memory indefinitely until cleared.

The present disclosure eliminates the need to consider part-to-part variation by adapting the values for the pawl sensor regions to each given park system unit. This produces accurate definitions of disengaged, tooth-to-tooth, and engaged bounds for each unit, offering more descriptive information of the pawl state, which in turn enables the use of the pawl sensor in both actuation directions. In this regard, the techniques disclosed herein provide more reliable information on the state of the pawl.

Referring now to FIG. 1, a functional block diagram of a BEV 100 having an example park securement system 102 according to the principles of the present application is illustrated. While the exemplary vehicle shown is a BEV 100, the principles discussed herein can be applied to any vehicle such as electrified vehicles and conventional internal combustion engine vehicles. The BEV 100 generally comprises an electrified powertrain 104 configured to generate (via an electric drive module, or EDM) drive torque to a driveline 108 for propulsion. It will be appreciated that the electrified powertrain 104 could have other suitable configurations. The electrified powertrain 104 generally comprises one or more electric motors 112, a high voltage battery system 116 for powering the electric motor(s) 112, and a DC-DC converter 120. While the DC-DC converter 120 is generally shown as part of the electrified powertrain 104, it will be appreciated that the DC-DC converter 120 could be located separately from the electrified powertrain 104. An electrified vehicle control unit or controller 124 is configured to control operation of the BEV 100.

One primary control aspect of the controller 124 is to control the electrified powertrain 104 to generate a desired amount of drive torque to meet a driver demand (e.g., input via an accelerator pedal). The controller 124 is typically powered by a low voltage battery 128, which could also be utilized to power one or more accessory loads 132 of the BEV 100. Another control aspect of the controller 124 is that it comprises a power inverter module (PIM) 136 (e.g., switches/relays for generating control signal(s)) for command of a park pawl system 140 of the BEV 100.

In one exemplary implementation, the park pawl system 140 comprises an actuator 144 (e.g., an electric motor), a cam 150, a park pawl 164, a sensor 178 and a park gear 190. The actuator 144, in response to signal(s) generated by the PIM 136 to drive a shift shaft 148, rotates the cam 150 that is pre-loaded by a compression spring 154. A cam surface 156 on the cam 150 slidably engages a pawl engagement member 160 on the pawl 164, causing the pawl 164 to rotate around a pawl shaft 170. The exemplary pawl 164 includes a magnet 174. The sensor 178, such as a hall effect sensor, senses a position of the magnet 174 and communicates a signal to the controller 124 indicative of a position of the park pawl 164.

Figure 2:
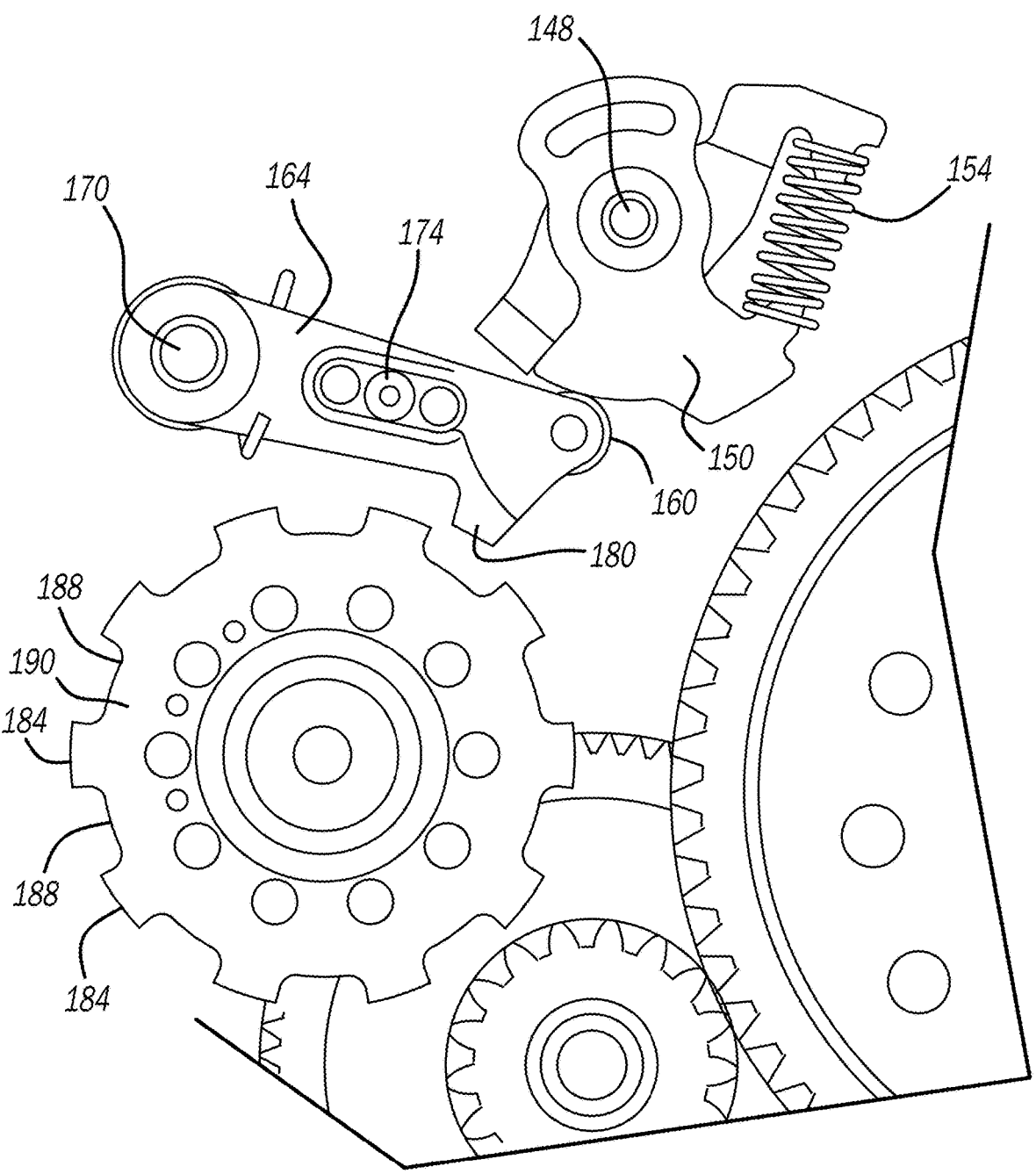
FIG. 2 is a front view of a park pawl assembly of the example park securement system of FIG. 1 and shown with the park pawl in a fully disengaged position according to the principles of the present application.
Figure 3:
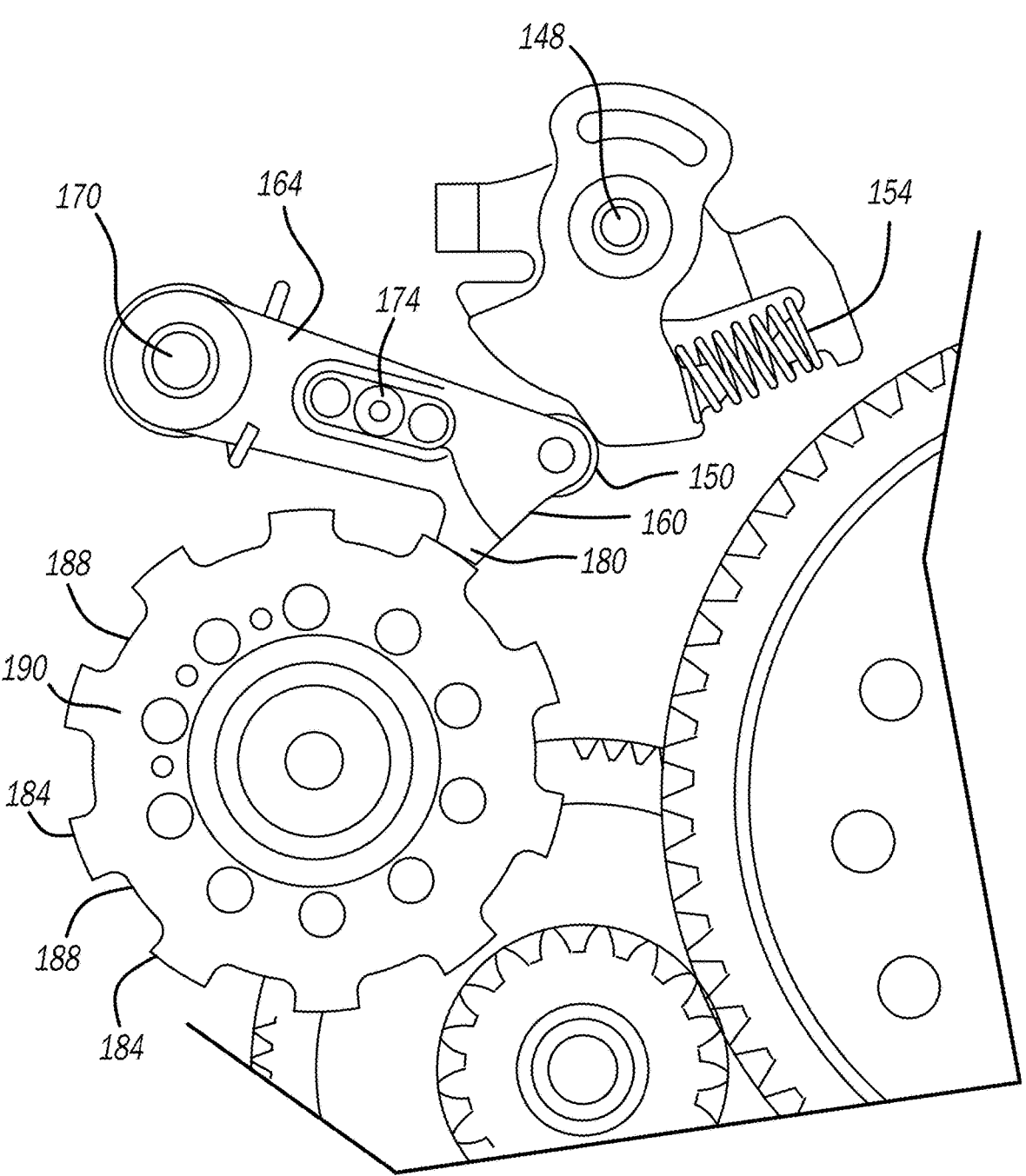
FIG. 3 is a front view of a park pawl assembly of the example park securement system of FIG. 1 and shown with the park pawl in a tooth-butt position according to the principles of the present application.
Figure 4:
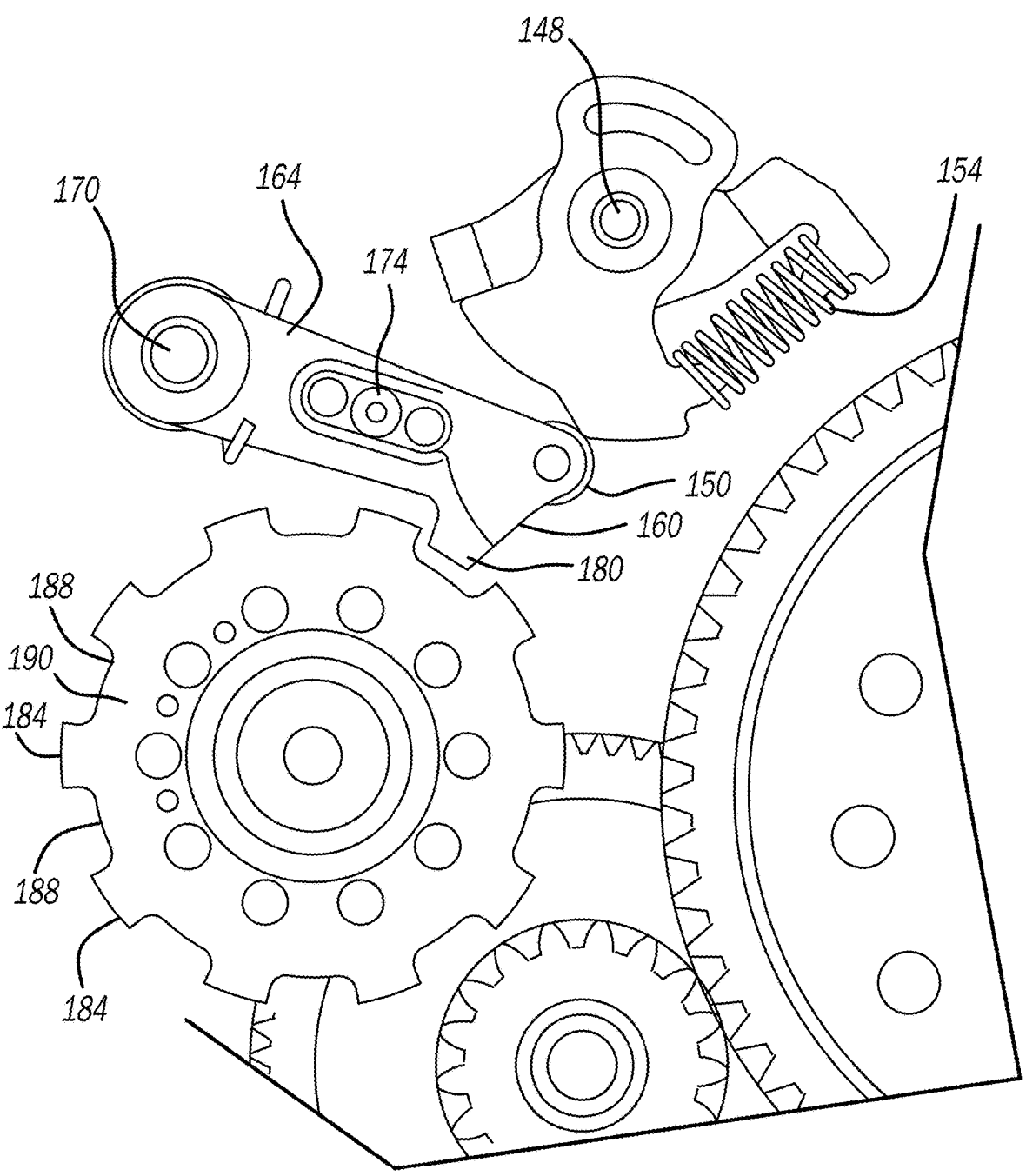
FIG. 4 is a front view of a park pawl assembly of the example park securement system of FIG. 1 and shown with the park pawl in a 2.5 mm engaged or between a tooth-butt and fully engaged position according to the principles of the present application.
Figure 5:
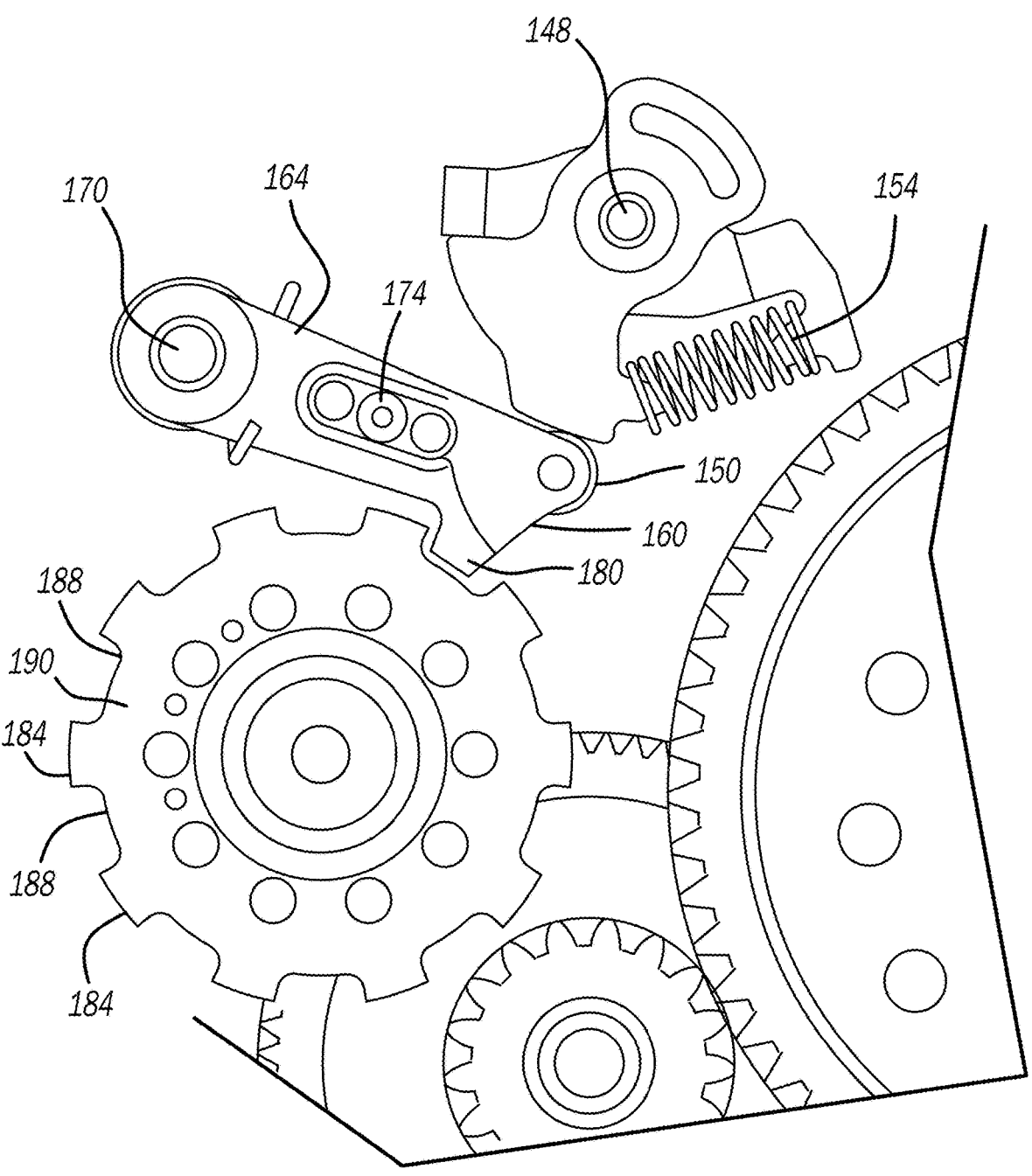
FIG. 5 is a front view of a park pawl assembly of the example park securement system of FIG. 1 and shown with the park pawl in a fully engaged position according to the principles of the present application.

The park pawl 164 includes a pawl tooth 180 that locates relative to teeth, collectively identified at 184, and cavities, collectively identified at 188 on a park gear 190. FIGS. 2-5 illustrate various operating states of the park pawl system 140. FIG. 2 is a front view of a park pawl system 140 shown in a fully disengaged position. In the fully disengaged position, the tooth 180 of the park pawl 164 is retracted from engagement with the teeth 184 and cavities 188 of the park gear 190. FIG. 3 is a front view of the park pawl system 140 shown in a tooth-butt position. FIG. 4 is a front view of the park pawl system 140 shown in a 2.5 mm engaged or between a tooth-butt and fully engaged position. FIG. 5 is a front view of the park pawl system 140 of the example park pawl system 140 shown in a fully engaged position.

The high voltage battery 116, the DC-DC converter 120, and the low voltage battery 128 are also generally referred to as an electrical system 194 of the BEV 100. For example, the electrical system 194 could comprise the high and low voltage buses connected to these devices with the DC-DC converter 120 operating therebetween.

The controller 124 executes operating steps that adapt to each park pawl system unit (unique to each vehicle components that the controller 124 is in). The controller 124 measures sensor output at the maximum disengaged point (FIG. 2), and then calculates the engaged, tooth-to-tooth, and disengaged regions from this reference. This offers resilience to park pawl system unit part-to-part variation and increases separation between the possible ranges of values for reach region, eliminating overlap that may exist. The maximum disengaged position is used as a reference point since it can be achieved 100% of the time, whereas the engaged or tooth-to-tooth reference are each intermittent states depending on the rotational position of the park gear 190 when the pawl 164 is engaged.

Figure 7:
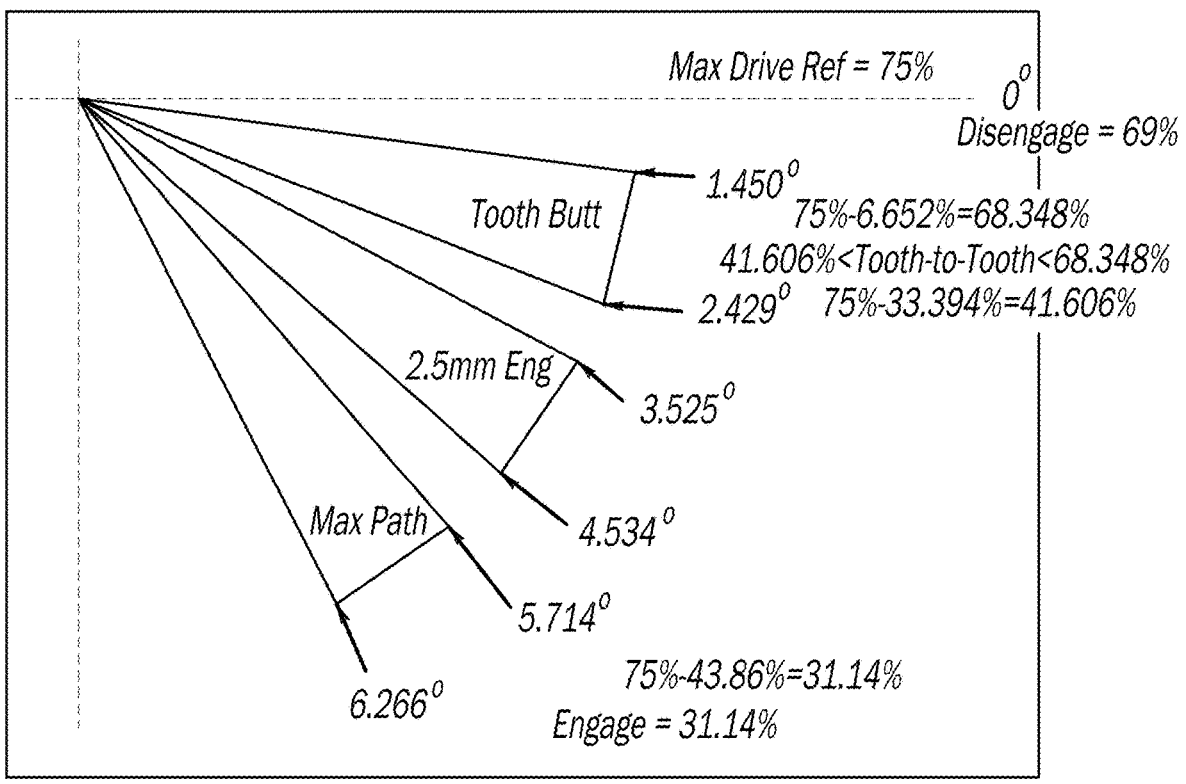
FIG. 7 is an exemplary stack up analysis plot using 75% as an arbitrary example for maximum drive reference, the bounds for disengage, tooth-to-tooth and engage regions calculated using according to the principles of the present application.

To calculate the values for each region, a population hardware stack-up analysis with the reference point at maximum disengaged state must be used to define the possible angular distance from the pawl 164 to the reference for each region's bounds. The bounds for the regions in this stack-up type will have significantly more separation when compared to a population hardware stack-up using an arbitrarily defined sensor value as the reference that is not anchored to any physical landmark. An example of a stack-up analysis with maximum disengaged point as a reference is shown in FIG. 7. FIG. 7 represents the extreme cases for any given park pawl system in the population for the bounds of each range. This stack-up will be used for the calculations of the algorithm discussed herein.

The sensor 178 will have a conversion factor to relate pawl angle to its output. For the hall effect sensor used in the example, angle is represented by a duty cycle (DC) percentage. The exemplary conversion ratio is 10% for each degree. It will be appreciated that other conversion ratios may be used within the scope of this disclosure. Additionally, sensor error is included in the calculation for the bounds of each region as well and will vary based on the bound being calculated. The exemplary different region calculation methods are explained below.

Disengaged position: Upper Bound=Any DC greater than Lower Bound. Lower Bound=Reference point duty cycle %−sensor error at this position %.

Tooth-to-Tooth position: Upper Bound=Reference point duty cycle %−(10%/deg*1.450 deg)+sensor error at this position %. Lower Bound=Reference point duty cycle %−(10%/deg*2.429 deg)−sensor error at this position %.

Engaged position: Upper Bound=Reference point duty cycle %−(10%/deg*5.714 deg)+sensor error at this position %. Lower Bound=Any DC less than Upper Bound.

Sensor error calculation is a bit more complex and depends on the region and bound. When considering sensor error, there are 2 considerations: Shifts of line that occur for a single sensor (i.e. temp changes during operation); and any changes in slope of the line which deviate the nominal 10%/degree conversion ratio (i.e. air gap differences between sensors).

In examples, shifts of line that occur from part to part (i.e. magnet to magnet variation) are ignored as the adaptive calculation of the pawl sensor regions will nullify that error.

Figure 6:
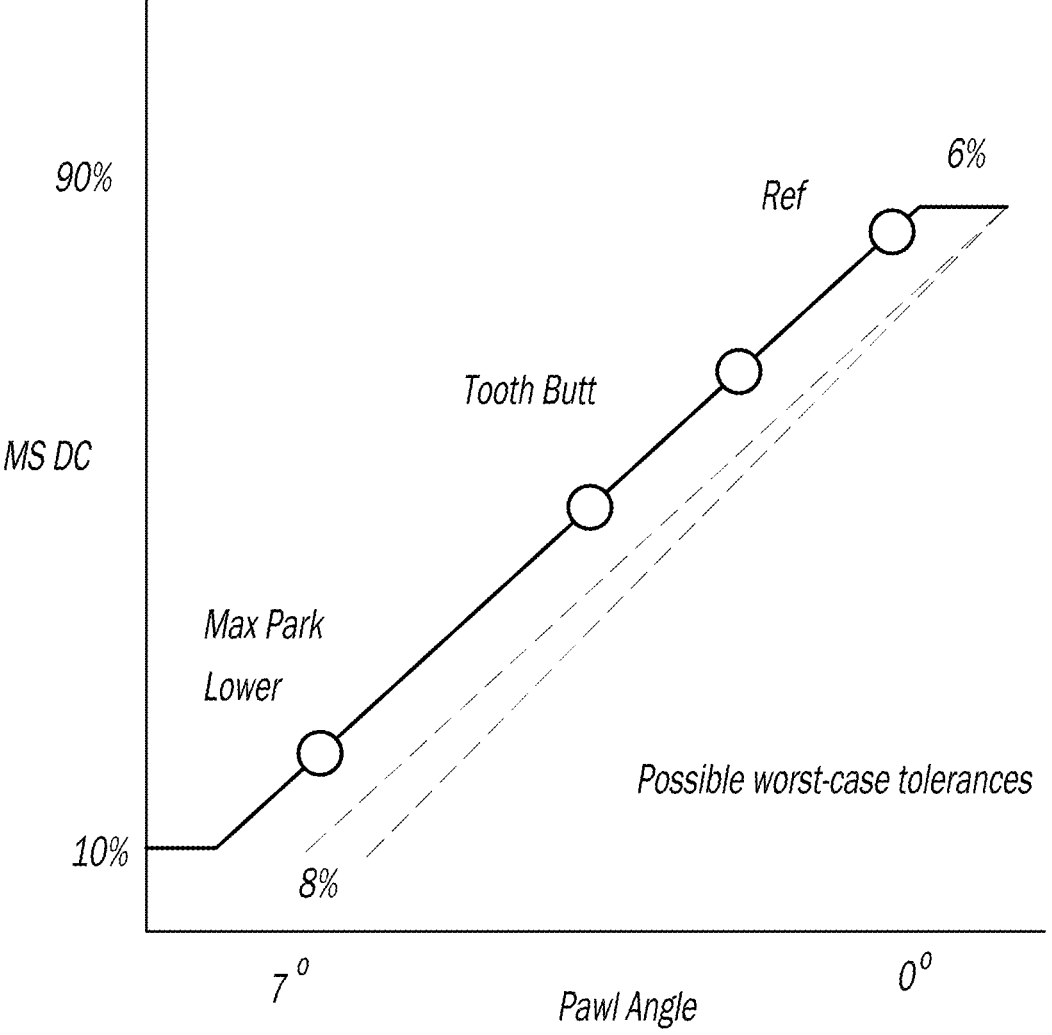
FIG. 6 is an exemplary error calculation plot for each region bound illustrating a 6% maximum shift error plus up to 8% maximum slope error.

Continuing with characteristics from the example sensor 178, the shift of the line in a single sensor can contribute up to +/−3% error, and the air gap differences between sensors can contribute up to +/−4% error on each end of the line due to rotation of the line around the center point causing a slope difference. Thus, depending on which region bound being calculated, 1) the shifts could cause a total of 6% difference from the pre-error calculation (i.e. sensor learns bounds while very cold, then gets very hot during operation), and 2) the slope could cause up to an 8% difference from at the furthest point from reference. Since Tooth Butt is on the same side of the center point as Max Drive, there will be less than 4% difference tolerance from slope. However, projecting to Max Park could approach 8%. This calculates to 6% error at Max Drive through 14% error at Max Park. FIG. 6 demonstrates this concept.

The shift error will be the same for all bounds. A custom multiplier for the slope error of each range is used to determine the duty cycle needed to deduct from the reference duty cycle to achieve the bounds for each range. This multiplier is based off what portion of the total pawl travel the region bound in question is from the reference. Referencing FIG. 6 and assuming that Max Park to Max Drive uses the full range of the sensor 178 (meaning full slope swing will be present), then 1.450 degrees of travel from the reference/total of 6.266 degrees of max travel=0.231. This process can be done for each bound to calculate the errors below.

Disengaged error: Upper Bound error=Any DC greater than Lower Bound. Lower Bound error=6% (shift)+8%*0=6%.

Tooth-to-Tooth error: Upper Bound error=6% (shift)+8%*0.231=7.848%. Lower Bound error=6% (shift)+8%*0.388=9.104%.

Engaged error: Upper Bound error=6% (shift)+8%*0.910=13.28%. Lower Bound error=Any DC less than Upper Bound.

The final calculation for each region's bounds is shown below:

Disengaged position: Upper Bound=Any DC greater than Lower Bound; Lower Bound=Reference point duty cycle %−6%.

Tooth-to-Tooth position: Upper Bound=Reference point duty cycle %−(10%/deg*1.450 deg)+7.848%=Reference point duty cycle %−6.652%.

Lower Bound=Reference point duty cycle %−(10%/deg*2.429 deg)−9.104%=Reference point duty cycle %−33.394%.

Engaged position: Upper Bound=Reference point duty cycle %−(10%/deg*5.714 deg)+13.28%=Reference point duty cycle %-43.86%; Lower Bound=Any DC less than Upper Bound. Using an arbitrary example of a reference measured at 75%, FIG. 8 would quantify the calculated regions using the final calculations above. It will be appreciated by those skilled in the art that the above values are merely exemplary. In this regard, other values may be used while still reaching the advantages sought by the present techniques.

Figure 8:
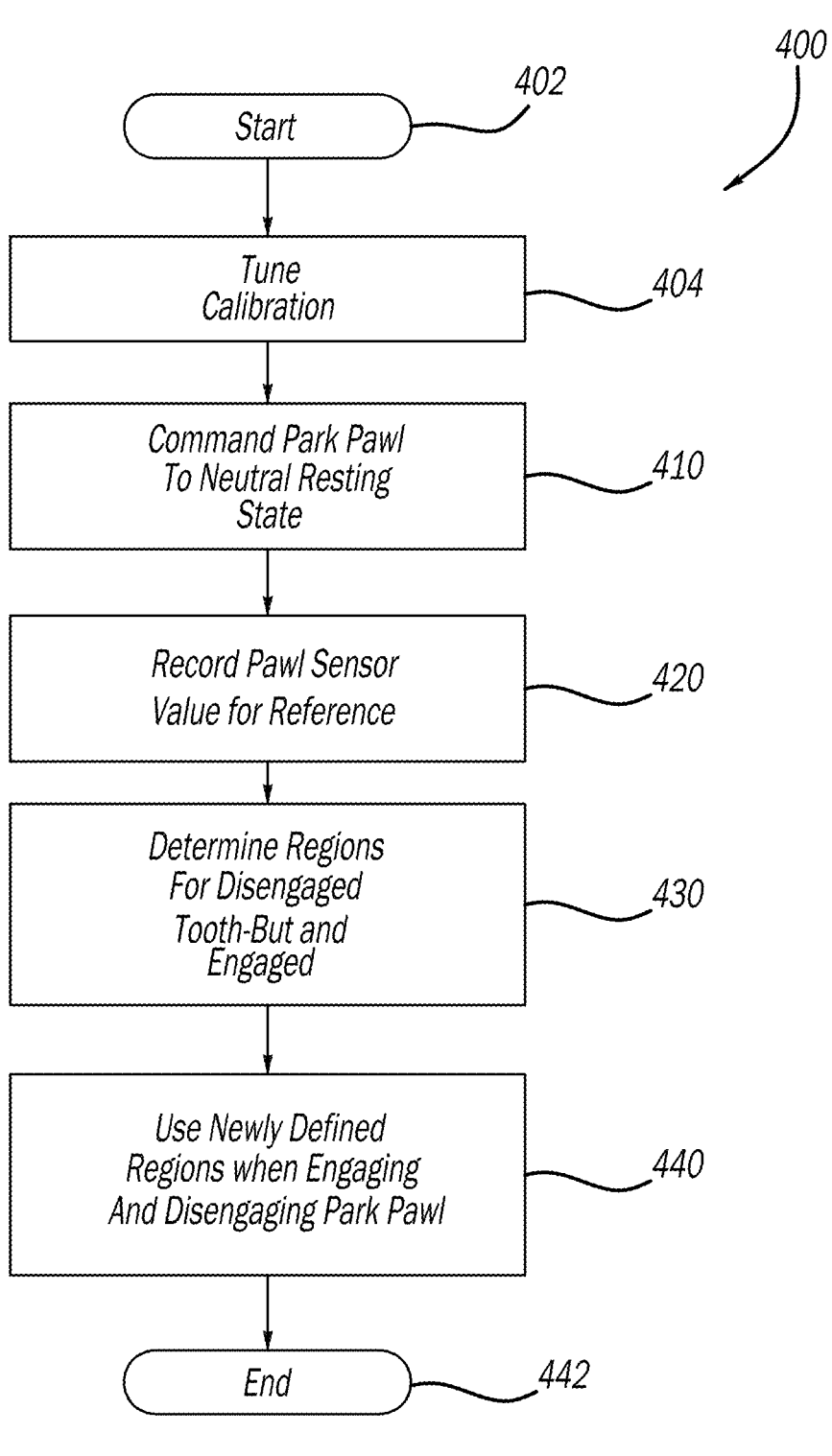
FIG. 8 is a flow diagram of an example method of operating the park securement system according to the principles of the present application.

Referring now to FIG. 8, an example method 400 for operating the park securement system 102 according to the principles of the present application is illustrated. While the BEV 100 and its components are specifically referenced for illustrative/descriptive purposes, it will be appreciated that the method 400 could be applicable to any suitable BEV. The method starts at 402. At 404, the calibrations are tuned based on pawl position sensor 178 parameters and park system 140 hardware stack-up analysis.

The exemplary values set forth in parenthesis reflect the above exemplary calculations. Pawl position sensor parameters can include: pawl angle to pawl sensor duty cycle conversion ratio (10%/deg); pawl sensor maximum shift error (6%); and pawl sensor maximum slope error (8%). Park system hardware stack-up analysis can include: pawl maximum travel angle (6.266); reference to tooth-to-tooth upper angle (1.450); reference to tooth-to-tooth lower angle (2.429); and reference to maximum park angle (5.714).

At 410, the park pawl 164 is commanded to a neutral resting state (maximum disengaged state). When the first reverse, neutral, or drive request is commanded, the actuator 144 (DC motor) will rotate the park system as far as possible in the disengage direction until an end stop is detected through stall current (a phenomena which involves motor current increasing as the rotational speed of the motor decreases due to reduction in back-voltage), and through lack of change in actuator position sensor feedback.

The pawl sensor value at this state is recorded at 420 as a reference. Control can further determine whether the value falls within the expected range defined by parameters based on the hardware dimensions for the population of parts, then it is used as the reference for the adaptive pawl sensor region calculations.

At 430, the regions for disengaged, tooth-butt, and engaged are calculated using calculations from identified parameters from the tuned calibrations. At 440, the newly defined regions are subsequently used when engaging and disengaging the park pawl 164. The process can be selected whether to be performed every key cycle, or can be stored in memory indefinitely until cleared. The method ends at 442.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A park securement system for a vehicle, the system comprising:
  a park pawl system having:
    a park pawl having a pawl engagement member, a park tooth, and a magnet;
    an actuator that rotates a cam into engagement with the park engagement member that imparts rotational motion onto the park pawl;
    a park gear having a plurality of teeth and cavities, wherein the park pawl interacts with the plurality of teeth and cavities between engaged and disengaged positions; and
    a sensor that senses the magnet and communicates a signal indicative of a position of the park pawl; and
  a controller configured to:
    command the park pawl to a neutral resting state;
    record a park pawl value at the neutral resting state;
    determine a park pawl angle for additional regions based on the recorded park pawl value; and
    implement the determined park pawl angle for additional regions when one of engaging and disengaging the park pawl on subsequent cycle.

2. The system of claim 1, wherein the neutral resting state is a maximum disengaged state between the park pawl and the park gear.

3. The system of claim 1, wherein the park pawl value is indicative to duty cycle of the sensor.

4. The system of claim 2, wherein the sensor is a hall effect sensor and park pawl angle is represented by a duty cycle percentage of the hall effect sensor.

5. The system of claim 1, wherein each degree of park pawl angle is indicative of 10% duty cycle percentage.

6. The system of claim 5, further comprising:
  a biasing member that biases the cam into engagement with the park pawl.

7. The system of claim 1, wherein the additional regions comprises a disengaged region indicative of the park pawl being disengaged from the park gear.

8. The system of claim 1, wherein the additional regions comprises a tooth-butt region indicative of the park tooth on the park pawl engaging a tooth of the plurality of teeth on the park gear.

9. The system of claim 1, wherein the additional regions comprises an engaged position indicative of the park tooth nested into a cavity of the plurality of cavities between adjacent teeth of the plurality of teeth.

10. A method of operating a park securement system for a vehicle, the park securement system having a park pawl system and a controller, the park pawl system having a park pawl, an actuator, a park gear and a sensor, the park pawl having a pawl engagement member, a park tooth, and a magnet, the actuator configured rotates a cam into engagement with the park engagement member that imparts rotational motion onto the park pawl, the park gear having a plurality of teeth and cavities, wherein the park pawl interacts with the plurality of teeth and cavities between engaged and disengaged positions, the sensor configured to sense the magnet and communicate a signal indicative of a position of the park pawl, the method comprising:
  commanding the park pawl to a neutral resting state;
  recording a park pawl value at the neutral resting state;
  determining a park pawl angle for additional regions based on the recorded park pawl value; and
  implementing the determined park pawl angle for additional regions when one of engaging and disengaging the park pawl on subsequent cycle.

11. The method of claim 10, wherein the neutral resting state is a maximum disengaged state between the park pawl and the park gear.

12. The method of claim 10, wherein the park pawl value is indicative to duty cycle of the sensor.

13. The method of claim 10, wherein the sensor is a hall effect sensor and park pawl angle is represented by a duty cycle percentage of the hall effect sensor.

14. The method of claim 10, wherein each degree of park pawl angle is indicative of 10% duty cycle percentage.

15. The method of claim 10, wherein the additional regions comprises a disengaged region indicative of the park pawl being disengaged from the park gear.

16. The method of claim 10, wherein the additional regions comprises a tooth-butt region indicative of the park tooth on the park pawl engaging a tooth of the plurality of teeth on the park gear.

17. The method of claim 10, wherein the additional regions comprises an engaged position indicative of the park tooth nested into a cavity of the plurality of cavities between adjacent teeth of the plurality of teeth.

\*    \*    \*    \*    \*